United States Patent
Graser et al.

(10) Patent No.: US 7,734,677 B2
(45) Date of Patent: Jun. 8, 2010

(54) METHOD, SYSTEM AND PROGRAM PRODUCT FOR DYNAMICALLY INTEGRATING BACKEND SYSTEMS INTO A J2EE APPLICATION SERVER ENVIRONMENT

(75) Inventors: Thomas Graser, Leonberg (DE); Matthias Haeussler, Nattheim (DE); Bernd Jostmeyer, Weil in Schoenbuch (DE); Juergen Schneider, Althengstett (DE)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 11/536,182

(22) Filed: Sep. 28, 2006

(65) Prior Publication Data

US 2008/0244623 A1    Oct. 2, 2008

(30) Foreign Application Priority Data

Sep. 29, 2005    (DE)    ................... 05109029

(51) Int. Cl.
G06F 15/16    (2006.01)
G06F 9/44    (2006.01)
(52) U.S. Cl. ........................... 709/201; 719/328
(58) Field of Classification Search ............... 719/238
See application file for complete search history.

(56) References Cited

U.S. PATENT DOCUMENTS

| 7,080,092 | B2* | 7/2006 | Upton | 707/102 |
| 7,546,606 | B2* | 6/2009 | Upton | 719/318 |
| 2004/0045008 | A1* | 3/2004 | June et al. | 719/316 |
| 2004/0078495 | A1* | 4/2004 | Mousseau et al. | 710/1 |
| 2004/0098726 | A1* | 5/2004 | Currie et al. | 719/310 |
| 2005/0028164 | A1* | 2/2005 | Neuwald et al. | 719/310 |
| 2005/0044197 | A1* | 2/2005 | Lai | 709/223 |
| 2006/0053087 | A1* | 3/2006 | Pavlov | 707/1 |
| 2006/0069801 | A1* | 3/2006 | Rich et al. | 709/232 |

* cited by examiner

*Primary Examiner*—Wing F Chan
*Assistant Examiner*—David Yi
(74) *Attorney, Agent, or Firm*—John E. Campbell; Daryl Neff (57) ABSTRACT

A method, system and program product is provided for dynamically integrating Backend System instances into a J2EE application server environment during runtime without having to restart the J2EE application server environment. The system comprises a deployment descriptor for deploying a J2C Connector into the J2EE application server environment and a Join/Leave manager. The manager implements an interface for detecting the Backend System instances, and an interface for providing access data and status information about the Backend System instances to the application. In addition, at least one node is enabled to run an application or its subcomponent for adding access data to, and deleting it from a storage media.

19 Claims, 7 Drawing Sheets

METHOD, SYSTEM AND PROGRAM PRODUCT FOR DYNAMICALLY INTEGRATING BACKEND SYSTEMS INTO A J2EE APPLICATION SERVER ENVIRONMENT

BACKGROUND OF THE INVENTION

1. Field of the Invention

The present invention relates to management of distributed computing environments consisting of application servers and Backend Systems that may reside on multiple nodes, and particularly to a method and respective system for dynamically integrating Backend Systems into a J2EE application server environment.

2. Description of Background

Software system architectures that consist of Backend Systems, application servers, and client applications are called three-tier architectures. To cope with various challenging aspects of the development and deployment of such software architectures, the Java2 Enterprise Edition (J2EE) standard has been defined by Sun Microsystems, with assistance by many other contributors. It consists of a set of sub-standards, each of which describes one key aspect that an application server that conforms to the J2EE standard has to comply to. Implementations of the J2EE standard include IBM WebSphere, BEA WebLogic, and SAP NetWeaver.

One of those sub-standards is the Java2 Connector (J2C) architecture, which defines some system contracts and interfaces that describe how legacy Backend Systems should be attached to a J2EE application server. Those Backend Systems do typically not implement the J2EE standard themselves, but they provide a connector (J2C connectors A, B, C—see FIG. 1) that allows J2EE applications to interact with them.

Figure 1:
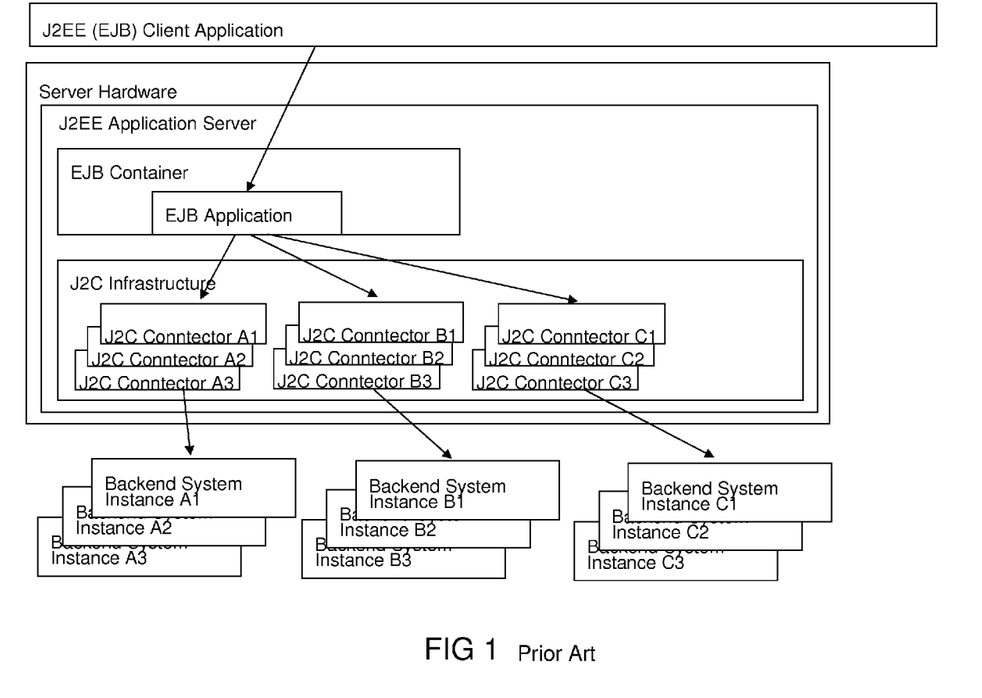
FIG. 1 is a schematic system view on a prior art J2EE environment.

The term "Backend System" is used as a synonym to "Enterprise Information System" (EIS). Typically, these Backend Systems are software applications that may used to store or retrieve data, like databases or transaction systems. However, any server application may be attached to the J2EE application server as a Backend System instance, such that the applications running within the J2EE application server are able to drive all kinds of requests against the Backend System instance that are supported. FIG. 1 is an illustration of this concept.

In order to add Backend System instances A1-A3 to the scope of the J2EE application server, typically an administrator has to deploy the appropriate JC2 connectors A1-A3 (see FIG. 1) along with the specific identification data for that particular Backend System instance. The J2C connector's deployment descriptor defines which properties are required to identify a Backend System instance. The administrator has to provide values that relate to those properties at deployment time. The J2EE application server has to be restarted for these changes to take effect.

Analogously, in order to remove a particular instance of a Backend System instance from the scope of the J2EE application server, typically an administrator has to remove the previously entered data for that particular Backend System instance.

For the purposes of J2EE application server system administration, the type of Backend Systems is coupled with the identification and access data for the individual Backend System instance, thus requiring that the J2EE application server is restarted each time when a Backend System instance is added or removed.

For J2EE application servers that have the need to interact with a highly dynamic set of Backend Systems, this administrative effort for each Backend System instance is unacceptable. For example, systems management applications have to be able to include and exclude an unpredictable set of Backend Systems of the same type without a service interrupt of the systems management application itself. It is quite common that systems are added and removed over time (within a daily, weekly, or other schedule) as the business needs demand various levels of computing capacity. This is particularly true as businesses increasingly adapt "on demand" technologies into their core processes.

To provide high availability of the application server under these circumstances, one typically deploys the application in a clustered environment. When topology updates have to be made, then one of the cluster nodes is modified at a time, while the other nodes remain online. This procedure is called "rolling update".

However, if there are no other compelling reasons to build a clustered environment than the ability to provide rolling updates when the topology changes, then this solution is far too expensive, since the cluster infrastructure itself needs to be purchased, deployed, and maintained.

Consequently, it is desirable to provide a method and system for adding, using, removing Backend System instances belonging to the same type of Backend System—which does not conform to the J2EE specification —to or from a J2EE application server environment during runtime without restarting the J2EE application server.

SUMMARY OF THE INVENTION

The shortcomings of the prior art are overcome and additional advantages are provided through a method, system and program product for dynamically integrating Backend System instances into a J2EE application server environment, is introduced. The method comprises deploying a J2C connector suitable for Backend System instances belonging to the same type of Backend Systems (A; B; C) into the J2EE application server environment by using a J2C deployment descriptor which does not contain properties for identifying and connecting to a Backend System instance (A1-A3; B1-B3; C1-C3; access data); restarting the J2EE application server; detecting availability of Backend System instances (A1-A3; B1-B3; C1-C3); determining access data to said Backend System instances; persistently storing the access data; reading the access data and passing them as a part of a request to said J2C connector (A; B; C) in any case an operation on the particular Backend System instance has to be performed; and automatically creating a connection with said particular Backend System instance by the J2C connector (A; B; C) at runtime without restarting said J2EE application server.

In one embodiment, the method, system and program product replaces a prior art concept of deploying an own J2C connector for each Backend System instance requiring a restart of the J2EE application server each time a new Backend System instance is added by a J2C connector per type of Backend Systems requiring a single restart of the J2EE application server only. This is achieved by following adaptations and extensions: The deployment descriptor of the J2C connector does not contain properties related to the identification of Backend System instances, so there is no need anymore to provide manually identification information for accessing a particular Backend System instance during the J2C connector deployment.

The identification information is automatically provided to the J2EE application server at runtime by a newly introduced component—Join/Leave manager. The Join/Leave manager has access to the identification data and provides them to the business application running in the J2EE application server.

In one embodiment, the business application provides the new functionality to store, access and use those identification data for each Backend System instance. Therefore it is no longer needed to restart the J2EE application server each time a new Backend System instance is added or removed but only once when the J2C connector is deployed.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

The present invention shows that by providing J2EE application code that uses other subsystems that exist in any J2EE application server, these missing access data (data for identifying and connecting to a Backend System instance) may be dynamically entered into the system, used by the system, and removed from the system at runtime without any further need to restart it. Effectively, that J2EE application provides a registry of Backend System instances.

Figure 2A:
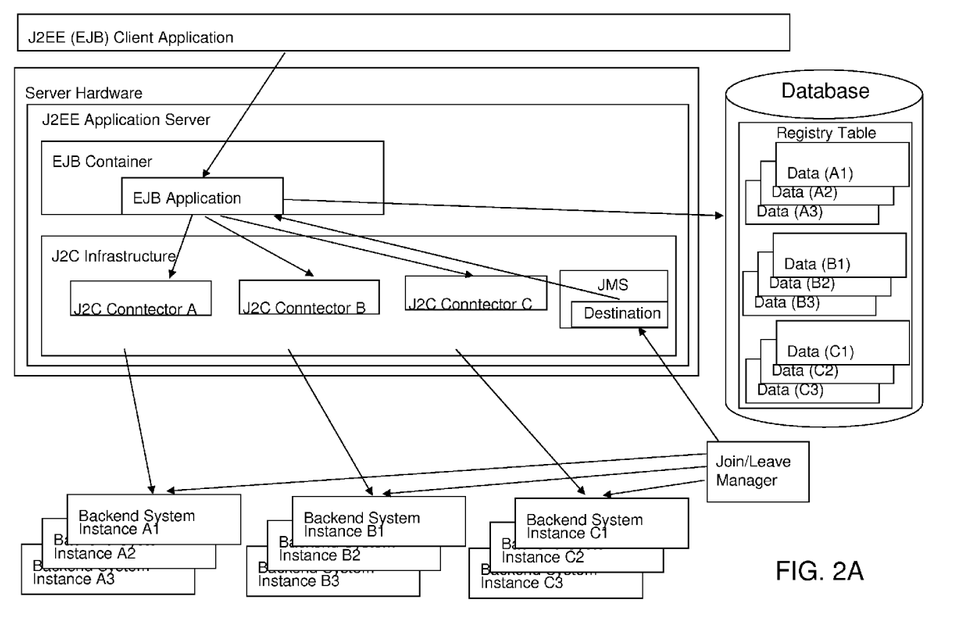
FIG. 2A is a schematic system view on the J2EE environment which implements the present invention.

As seen in FIG. 2A, Server Hardware is provided for execution of a J2EE application server. The J2EE application server includes an EJB ("Enterprise Java Beans") Container and J2C Infrastructure as further described herein. The following components are required by the preferred embodiment of the present invention and may be assumed to exist in any J2EE application server environment. A J2C connector which contains all the interfaces and code that are necessary to successfully deploy the connector into a J2EE application server and to connect to any Backend Systems that implements the interface that is expected by the connector (what we call a "type" of backend), without any data about a specific backend instance. An administrator deploys this J2C connector once, and restarts the J2EE application server.

An application or its subcomponent that additional implements interfaces for adding access data to, and deleting from a data base, and for automatically reading the access data from the database and providing them to the common J2C connector for creating a connection with a Backend System instance at run-time in any case an operation on a particular Backend System instance has to be performed.

Java Messaging System (JMS) for sending and receiving messages, e.g. receiving access data from newly introduced Join/Leave Manager and sending them to Message Driven Beans being part of the application.

Enterprise Java Beans (EJB) for client application access and various server programming patterns. This includes "entity beans" with Container Managed Persistence (CMP), which can be used to store data persistently (e.g. access data for identifying and connecting to Backend System instances). In addition, this includes Message Driven Beans (MDB) that can be used to receive and process JMS messages.

Finally, a software component called "Join/Leave Manager" is newly introduced. It is not part of the J2EE standard. The Join/Leave Manager obtains knowledge about the availability status of the Backend System instances. With availability status, it is meant the status if the Backend System instance is supposed to be available to the EJB application or if it should not be available at a given time.

It is not relevant for this invention how or when the Join/Leave manager obtains this information. It may rely on input by an administrator or by an automatic detection method.

In a first embodiment the Join/Leave Manager may be embedded into the Backend System instance itself, so that there are Join/Leave managers that each monitors a single Backend System instance only. The availability of each Join/Leave Manager directly reflects the availability of the corresponding Backend System instance.

A further embodiment the Join/Leave Manager is provided as a stand-alone application that reads data from a file or database which identify the Backend System instances to be available for use by the business application. Those data may be manually provided.

A further embodiment the Join/Leave Manager is provided as a stand-alone application that scans the accessible systems in the distributed environment for Backend System instances, e.g. by testing the availability of particular port numbers and by running a test statement against those ports resulting in confirmation that this system and port actually provide the entry-point to a Backend System instance.

Figure 2B:
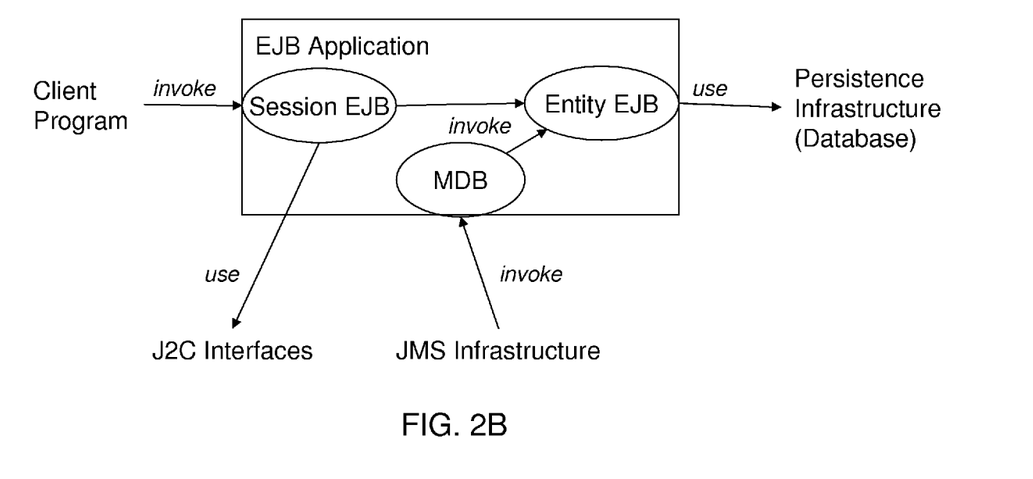
FIG. 2B is a preferred implementation of the business application and its interfaces to surrounding components within the J2EE architecture according to the present invention.

Whenever a Backend System instance A1-A3; B1-B3; C1-C3 should become visible to or invisible from the EJB application, then the Join/Leave Manager sends an appropriate JMS message to a well-known JMS destination (see FIG. 2A). This message contains all the information that is required to identify and connect to this particular Backend System instance. The JMS destination is linked to an MDB that is part of the EJB application, so the MDB receives the message (see FIG. 2B). The MDB evaluates the message and updates the Backend Systems registry that is kept in the database accordingly for this particular Backend System instance. The join and leave flows are described in more detail below (FIG. 2D, 2F).

As long as the data that identifies a particular Backend System instance is available in the registry, the EJB application may present this fact to a client application, or use the information internally only, depending on the application logic.

Whenever some client application or the EJB application itself have the need to contact the Backend System instance and perform some operation against it, then the EJB application may look up the information that is stored in the registry, and pass it to the J2C connector. It uses the information to create a connection to the Backend System instance identified by those data, and forwards the operation request to the Backend System instance. This flow is described in more detail below (FIG. 2E).

A further embodiment of the present invention the use of JMS and MDB in order to provide join and leave events to the EJB application are not mandatory. Instead, it is also possible to provide appropriate EJB methods within the EJB application that may be called by the Join/Leave manager whenever a Backend System instance joins or leaves.

Figure 2C:
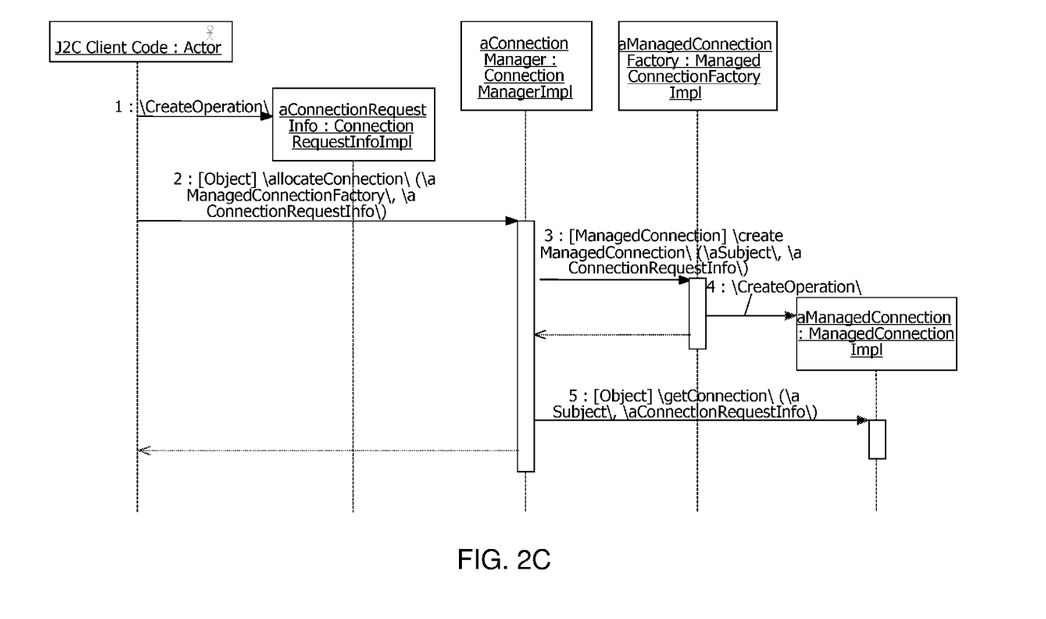
FIG. 2C is a sequence diagram which shows how a connection to a Backend System instance is created according to the J2C connector specification.
Figure 2D:
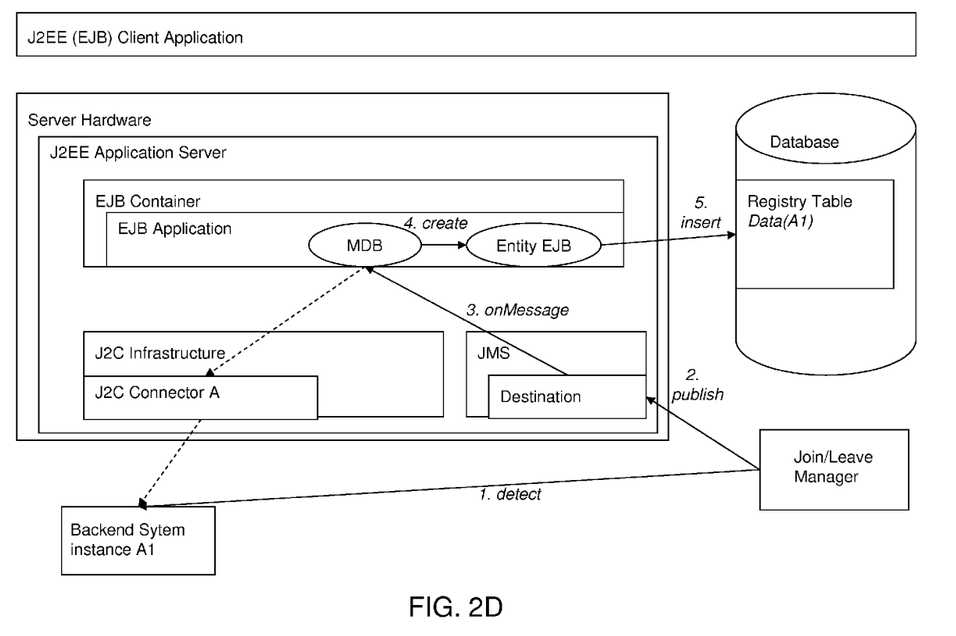
FIGS. 2D through 2F are flow diagrams which show the addition, use, and removal of a Backend System instance according to the present invention.
Figure 2E:
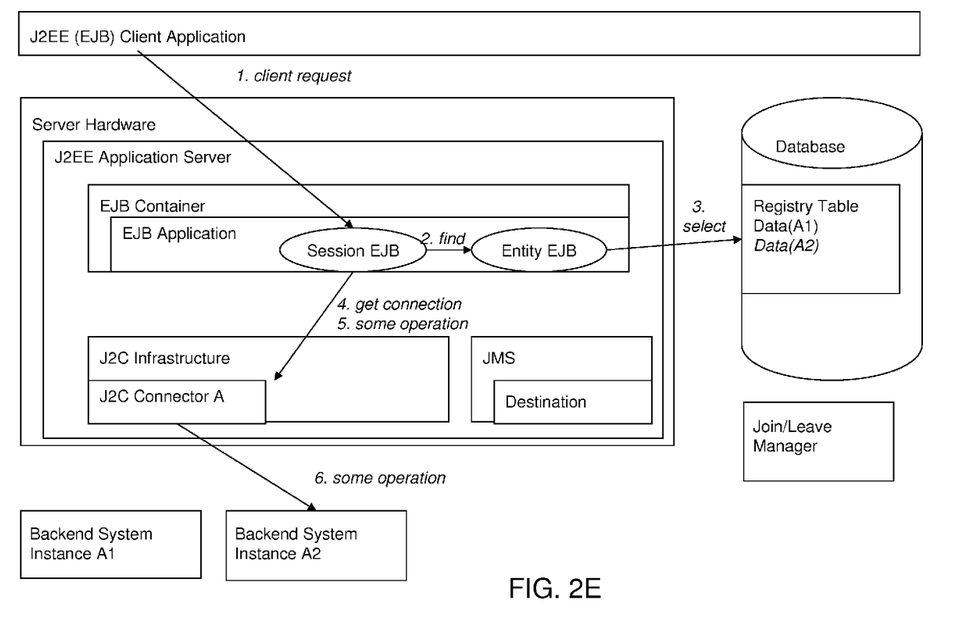
Figure 2F:
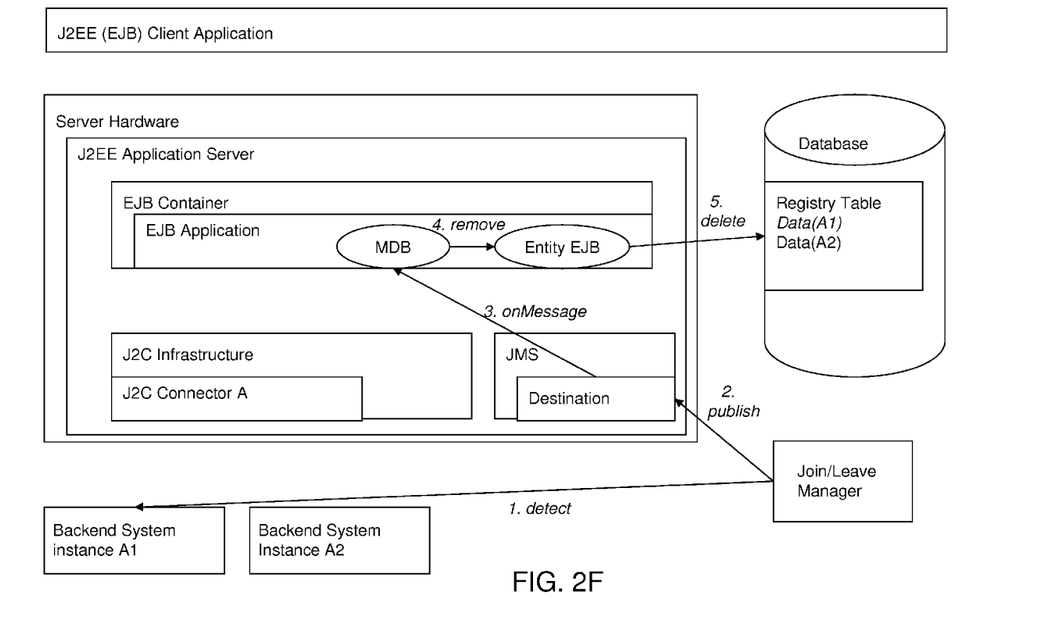

FIG. 2C shows the flow how a connection to the Backend Systems is created within the J2C architecture in general. As a naming convention, the connector-specific implementations of J2C interfaces are named like the corresponding J2C interface, with an "Impl" appended to it. For example, ConnectionManager is an interface defined by the J2C specification, and ConnectionManagerImpl is a class that implements the ConnectionManager interface. The object aConnectionManager is an instance of ConnectionManagerImpl. For the purpose of this invention, it is not relevant if the "J2C Client Code" is conforming to the Common Connector Interface (CCI, which in turn is a sub-specification of the J2C specification) specification or not. This general flow does not change.

To understand the crucial difference between the prior art J2C connector and the J2C connector that implements the invention, note that the ConnectionRequestInfo interface is empty, and the J2C specification states that the implementing class typically contains client-specific properties, for example, user name, password, language. Typically, it does not contain properties related to the configuration of a target Backend System instance like server name or port number (see J2C specification version 1.5, section 6.5.1.2). Instead, those data that identify a Backend System instance are kept within the instance of ManagedConnectionFactory itself. The J2C connector's deployment descriptor defines which properties are required by the ManagedConnectionFactory, and an administrator has to provide values that relate to the actual Backend System instance at deployment time (see J2C specification version 1.5, sections 17.4.1 and 17.4.2).

The invention proposes to implement these two aspects differently during development of a J2C connector that is capable of the dynamic behaviour described above: The implementation of the ConnectionRequestInfo interface should contain properties related to the configuration of a target Backend System instance, in addition to any other data that the application needs to identify the client. Therefore, the J2C connector's deployment descriptor does not need to contain those properties, and no related values need to be provided at the time of deployment.

FIG. 2D shows how a Backend System instance A1 is dynamically added to the registry according to the present invention.

Step 1: The Join/Leave Manager detects or decides otherwise that the Backend System instance A1 is available for use by the EJB application. The business rules or event types that trigger this step are outside the scope of this invention.

Step 2: The Join/Leave Manager creates a JMS message that includes connection information (access data) about the Backend System instance A1. This JMS message is published to a well-known JMS destination.

Step 3: Since an MDB contained in the EJB application is configured to listen to the same JMS destination, the MDB's onMessage method is invoked, and the JMS message is passed in. Step 4: The MDB analyzes the message and creates an entity EJB that contains some or all of the information contained in the message.

Step 5: The data contained in the entity EJB are inserted in the database. The preferred embodiment is to delegate this responsibility to the EJB container by using the Container Managed Persistence (CMP) pattern. Alternatively, one could also use the Bean Managed Persistence (BMP) pattern.

As an optional extension, the MDB may validate the correctness of the information contained in the JMS message by using it to establish a connection to the Backend System instance A1 before creating the entity EJB, as indicated by the dashed arrows.

FIG. 2E shows how the Backend System instance A1, A2 may be accessed by the EJB application, assuming it has been added just like Backend System instance A1 in FIG. 2D before.

Step 1: Some client application invokes a session bean request in the EJB application that either directly or indirectly creates the need to contact Backend System instance A2.

Alternatively, the need to contact Backend System instance A2 could arise while processing some JMS message, or while processing a timer-based event. In these cases, the flow is not triggered explicitly by a client application but by some other means.

Step 2: The Session Bean finds the Entity Bean that is related to Backend System instance A2.

Step 3: Finding an Entity Bean translates to selecting a row from the related database.

Step 4: As described in more detail in FIG. 2C, a connection to the Backend System instance A2 is created by using the data (A2) that were just retrieved from the database, and that are contained in the Entity Bean.

Steps 5 and 6: Using the connection to the Backend System instance A2, some operation request is passed to the Backend System instance A2.

FIG. 2F shows how a Backend System instance A2 leaves the scope of the EJB application, thus becoming unavailable to the EJB application (while the Backend System instance A1 itself may or may not continue to exist).

Step 1: The Join/Leave Manager initiates the process and decides that the Backend System instance A2 should leave the Backend Systems topology known to the EJB application, based on some rules or events that are outside the scope of this invention.

Step 2: The Join/Leave Manager creates a JMS message that includes identification information about the Backend System instance A2, and that it should be removed. This JMS message is published to a well-known JMS destination.

Step 3: Since an MDB contained in the EJB application is configured to listen to the same JMS destination, the MDB's onMessage method is invoked, and the JMS message is passed in. Step 4: The MDB analyzes the message, and finds and removes the entity EJB that relates to the information contained in the message.

Step 5: The table row related to the entity EJB is deleted from the database. The preferred embodiment is to delegate this responsibility to the EJB container by using the Container Managed Persistence (CMP) pattern. Alternatively, one could also use the Bean Managed Persistence (BMP) pattern.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. Method for dynamically integrating Backend System instances into a Java2 Enterprise Edition (J2EE) application server environment, comprising:

operating server hardware of a cluster of nodes to execute a plurality of J2EE applications, provide one or more Backend System instances through the cluster of nodes, and establish processing communication between a J2EE application server and said Backend System instances by deploying a Java2 Connector (J2C) connector suitable for Backend System instances belonging to the same type of Backend Systems into said J2EE application server environment by using a J2C deployment descriptor;

restarting said J2EE application server;

using a Join/Leave manager to:

detect availability of Backend System instances;

determine access data for particular ones of said Backend System instances, wherein said access data are detected by an automation detection method which scans the accessible systems in the distributed application environment for Backend System instances, said access data containing information sufficient to identify and connect to the particular Backend System instances;

persistently storing said access data to a storage medium; and reading said access data and passing them as a part of a request to said J2C connector, such that processing communication can be established automatically between said cluster of nodes executing said J2EE applications and those providing Backend System instances dynamically during runtime without requiring said J2EE applications to be reinitiated and without requiring said J2EE application server environment to be restarted.

2. The method of claim 1, wherein said J2EE application server environment further comprises an application running in a J2EE application server.

3. The method of claim 2, wherein a communication interface is provided between said application running in said J2EE application server and a J2EE client application running on a Client system.

4. The method of claim 3, wherein an interface for deploying a J2C Connector into said J2EE application server environment is provided.

5. The method of claim 4, wherein each J2C connector supports a specific communication interface for a particular type of Backend Systems.

6. The method of claim 5, wherein the availability of Backend System instances is provided to said client application.

7. The method of claim 5, wherein said access data includes a host name on which said Backend System instance resides, and a port number on which the Backend System instance listens for incoming requests.

8. The method of claim 1 wherein said automation detection method generates test statements for testing the availability of Backend System instances.

9. The method of claim 5, wherein said access data are read from a file or database which contains Backend System instances to be available for the application running in said J2EE application server.

10. A system for dynamically integrating Backend System instances into a Java2 Enterprise Edition (J2EE) application server environment, comprising:

a cluster of nodes including server hardware to execute a plurality of J2EE applications; and modules executable by the server hardware, the modules including a J2EE application server and a plurality of nodes providing Backend System instances;

an interface connector for establishing processing communication between said cluster of nodes processing J2EE application server and said Backend System instances;

said interface connector enabled to operate as a Java2 Connector (J2C) Connector;

a deployment descriptor for deploying said J2C Connector into said J2EE application server environment;

a Join/Leave manager for initiating and maintaining processing communication via said connector between said nodes executing said J2EE application server and said nodes providing Backend System instances, said Join/Leave manager implementing an interface for detecting Backend System instances, and an interface for providing access data for particular Backend System instances, wherein said access data are detected by an automation detection method which scans the accessible systems in the distributed application environment for Backend System instances, said access data containing information sufficient to identify and connect to a Backend System instance of the particular Backend System instances;

the server hardware in at least another node being operable to run an application or its subcomponent for adding access data information or for deleting such information from a storage media, such that processing communication can be established automatically by reading said access data from said storage media and for creating and maintaining communication between said nodes dynamically during runtime without requiring said J2EE applications to be reinitiated and without requiring said J2EE application server environment to be restarted.

11. The system of claim 10, wherein said J2EE application server environment further comprises an application running in a J2EE application server.

12. The system of claim 11, wherein a communication interface is provided between said application running in a J2EE application server and a J2EE client application running on a client system, an interface for deploying a J2C Connector into said J2EE application server environment.

13. The system of claim 12, wherein each J2C connector supports a specific communication interface for a particular type of Backend Systems.

14. The system of claim 13, wherein said Join/Leave manager is part of said Backend System instance.

15. The system of claim 13, wherein said deployment descriptor is part of said J2C connector.

16. The system of claim 13, wherein said Join/Leave manager implements an interface to a Java Messaging System (JMS) for providing said access data, wherein said JMS is linked to a Message Driven Bean (MDB), said MDB being part of said application which evaluates said access data, stores them in said database, and updates them accordingly.

17. A computer program product stored on a computer usable medium comprising computer readable program means for causing a computer to perform a method for dynamically integrating Backend System instances into a Java2 Enterprise Edition (J2EE) application server in a computer environment including server hardware of a cluster of nodes to execute a plurality of J2EE applications and provide Backend System instances, said method comprising:

deploying a connector having a Java2 Connector (J2C) implemented architecture suitable for Backend System instances belonging to the same type of Backend Systems into said J2EE application server environment by using a J2C deployment descriptor detecting availability of a plurality of Backend System instances;

determining access data to said Backend System instances for particular Backend System instances using a Join/

Leave manager, wherein said access data are detected by an automation detection method which scans the accessible systems in the distributed application environment for Backend System instances, said access data containing information sufficient to identify and connect to a Backend System instance of the particular Backend System instances;

persistently storing said access data;

reading said access data and passing them as a part of a request to said J2C connector; and automatically creating a connection with said particular Backend System instance by said J2C connector dynamically at runtime using an interface residing in said environment and using said stored access data, without requiring said J2EE application to be reinitiated and without requiring said J2EE application server environment to be restarted.

18. The computer program product of claim 17, wherein said J2EE application server environment further comprises an application running in a J2EE application server.

19. The computer program product of claim 18, wherein the method further comprises providing a communication interface between said application running in a J2EE application server environment and a J2EE client application running on a client system and providing an interface for deploying a J2C Connector into said J2EE application server environment, such that each J2C connector supports a specific communication interface for a specific type of Backend Systems selected from the plurality of Backend System instances.

* * * * *